Feb. 24, 1970  L. E. CRAIG ET AL  3,496,688
STAIR TREAD
Filed May 14, 1968
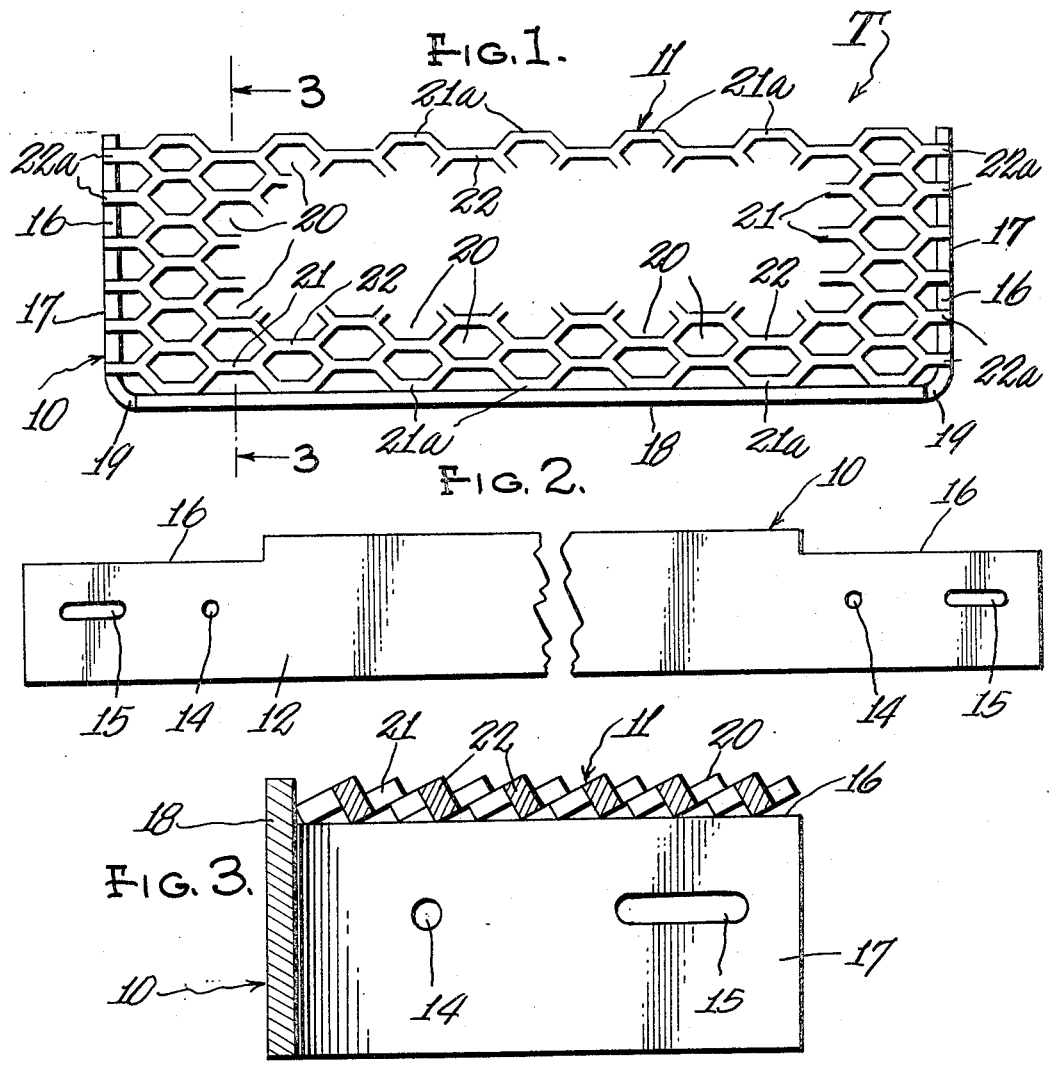
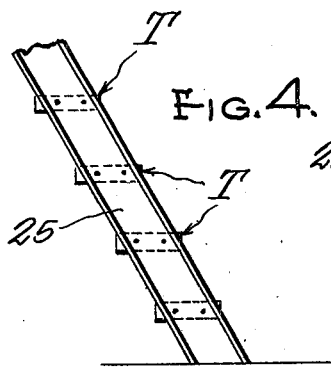
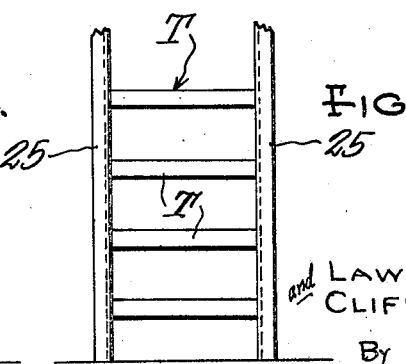
INVENTORS
LAWRENCE E. CRAIG
and CLIFFORD J. WEBBER
By Williams and Kreake
ATTORNEYS United States Patent Office 3,496,688
Patented Feb. 24, 1970

3,496,688
STAIR TREAD
Lawrence E. Craig and Clifford J. Webber, Niles, Ohio, assignors to Niles Expanded Metals Company, Niles, Ohio
Filed May 14, 1968, Ser. No. 729,019
Int. Cl. E04f 11/16, 19/10
U.S. Cl. 52—179
1 Claim

ABSTRACT OF THE DISCLOSURE

A rigid stair tread, formed of only two pieces, namely, a metal U-shaped frame and a tread of expanded metal welded to the frame. The frame has side legs which are notched at their upper edges and on which the opposite ends of the grating are seated in flush relationship and welded thereto.

Background and summary

Prior art constructions with which applicants are familiar consisted of a nose piece of angle cross-section, a back plate, and a grating surface section. The grating in such constructions was welded under the top of the nosing angle and to the back plate. This not only required extra material but also additional manufacturing operations. Further, since the grating was welded under the top of the nosing angle, a space was formed which normally had to be filled in for safety reasons.

In contrast, applicants' invention reduces the number of pieces for each tread to two, and simplifies and reduces the cost of assembly, without affecting utility of the tread. Further, assembly of applicants' tread avoids the objectionable space aforesaid.

Description of drawing

In the drawing accompanying this description and forming a part of this specification there is shown, for purposes of illustration, an embodiment which our invention may assume, and in this drawing:

FIGURE 1 is a plan view of our improved stair tread, parts being broken away,

FIGURE 2 is a plan view of a part of the stair tread, prior to final formation and assembly, FIGURE 3 is a sectional view, drawn to enlarged scale, corresponding to the line 3—3 of FIGURE 1, and FIGURES 4 and 5 are small scale side and front views of a stair structure embodying our improved construction.

Description of preferred embodiment

Our invention provides an extremely sturdy stair tread T which may be produced in quantity at low cost. The improved stair tread comprises only two parts, namely, a frame portion 10 and a tread portion 11 which is secured to and supported by the frame.

In the embodiment herein disclosed, the frame portion 10 is made of a formed hot rolled steel bar of dimensions suitable for a length and width and load capacity of the stair tread requirement. The frame portion is initially formed as a flat bar 12 which may be cut to size from a longer length. Holes and slots 14 and 15 are then punched at opposite ends of the bar and these ends are notched at their upper ends, as shown at 16 in FIGURE 2. Thereafter, the ends are bent at right angles to form a U-shaped frame, as seen in FIGURE 1, with the notched end portions 17 forming the side legs of the frame and the notched parts extending to the nose portion 18 of the frame, as seen at 19.

The tread portion 11 may be formed in any desired manner. Without describing in detail the manner in which the tread portion is manufactured, as that forms no part of our invention, it is suffice to say that this tread portion may be made by slitting or cutting a metal sheet at spaced intervals by means of suitably formed cutters or knives and stretching the sheet either simultaneously or subsequently to the slitting operation. The result produced is a reticulated structure comprising a plurality of integrally connected units designated generally at 20 in FIGURE 1. As shown, the units have spaced leg portions 21 and oppositely disposed and integrally joined at bond portions 22.

The tread portion is bond sheared to the width and length required and preferably to rectangular shape with leg portions 21a in alignment at opposite long sides of the tread portion, and integral bond portions 22a in alignment at opposite ends of the tread portion, as seen in FIGURE 1. Referring to FIGURE 3, one side of each tread unit 20 lies in a higher plane to provide relatively sharp upper ends to make the upper surface of the tread portion skidproof.

Again referring to FIGURE 3, it will be noted that the total thickness of the tread portion does not exceed the depth of the notching of leg portions 17, so that the nose portion 18 provides adequate front cover and protection for the tread portion to prevent a person from catching his shoe or the front of the tread portion and tripping or falling as a result thereof.

The frame 10 and tread portion 11, after being formed as above described, are then placed in a welding fixture, with the front leg portions 21a held firmly against the inner surface of the nose portion 18, and with the side bond portions 22a held firmly seated on the upper edge of respective notches in the legs 17. Thereafter, the tread portion is suitably joined to the frame by welding the front leg portions 21a (and preferably each front leg portion) to the inner side of the nose 18, and welding the side bond portions 22a (and preferably each side bond portion) to the upper edge of the notches 16 in respective legs 17. After welding, the tread is removed from the welding fixture and may be painted, if desired.

The result is an extremely rigid stair tread which is neat in appearance and free of any upward projections which might cause a person to trip. Since no bar is attached to the rear edge of the tread, as is customary in prior art devices, it may be easily cleaned because it is free of pockets or edges in which dirt may collect.

Referring to FIGURES 4 and 5, a plurality of stair treads T may be assembled with side supports to form a stair structure. In the illustrated embodiment, a pair of steel channels 25—25 are disposed in parallel relation and bolts or other fastening means are extended through aligned holes in the leg portions 17 and the channels and held in place in the usual manner. The slots 15 provide means for accommodating any slight misalignment of holes in the legs and channels. The assembly just described may be made before or after the channels are fixed in place.

We claim:
1. A rigid stair tread formed of only two pieces, one piece comprising a frame formed of bar steel which is bent flatwise to U-shape to provide a nose portion at the bight of the frame and spaced legs extending from opposite sides of the frame, and the other piece comprising a flat tread formed of expanded metal of a configuration to correspond to the plan of said U-shaped frame to provide a flat surface having front, back and opposite sides, each of said legs being notched at its upper edge and said notches being of a depth equal to the thickness of said tread and extending to the nose of said frame, said tread spanning said legs and having opposite sides supported on the notched edges of said legs and welded thereto, and the front side of said tread lying immediately behind said nose portion of said frame and welded thereto.

References Cited

UNITED STATES PATENTS

| | | | |
|---|---|---|---|
| 476,323 | 6/1892 | Stanwood | 52—179 |
| 2,135,837 | 11/1938 | Pattison | 52—179 |
| 2,329,678 | 9/1943 | Pennington | 52—180 X |
| 2,609,781 | 9/1952 | Gruetjen | 52—180 X |

HENRY C. SUTHERLAND, Primary Examiner

SAM D. BURKE III, Assistant Examiner

U.S. Cl. X.R.

52—658